United States Patent
Fehrenbach et al.

(10) Patent No.: US 7,639,176 B2
(45) Date of Patent: Dec. 29, 2009

(54) REFERENCE PULSE GENERATION

(75) Inventors: Josef Fehrenbach, Haslach (DE);
Daniel Schultheiss, Hornberg (DE);
Christoph Mueller, Oppenau (DE);
Karl Griessbaum, Muehlenbach (DE)

(73) Assignee: Vega Grieshaber KG, Wolfach (DE)

( * ) Notice: Subject to any disclaimer, the term of this patent is extended or adjusted under 35 U.S.C. 154(b) by 93 days.

(21) Appl. No.: 11/607,508

(22) Filed: Nov. 30, 2006

(65) Prior Publication Data

US 2007/0182621 A1    Aug. 9, 2007

Related U.S. Application Data

(60) Provisional application No. 60/741,190, filed on Nov. 30, 2005.

(30) Foreign Application Priority Data

Nov. 30, 2005   (DE) ................. 10 2005 057 053

(51) Int. Cl.
*G01S 13/08* (2006.01)
(52) U.S. Cl. .................................... 342/124
(58) Field of Classification Search ................. 342/124, 342/375
See application file for complete search history.

(56) References Cited

U.S. PATENT DOCUMENTS

| | | | | |
|---|---|---|---|---|
| 4,425,793 A | * | 1/1984 | Turton et al. .............. 73/290 R |
| 4,652,881 A | * | 3/1987 | Lewis ......................... 342/160 |
| 4,805,215 A | * | 2/1989 | Miller ..................... 379/406.08 |
| 5,075,863 A | * | 12/1991 | Nagamune et al. ........... 702/159 |
| 5,143,075 A | * | 9/1992 | Ishizuka ..................... 600/447 |
| 5,528,687 A | * | 6/1996 | Tanaka et al. ........... 379/406.12 |
| 5,656,774 A | | 8/1997 | Nelson et al. |
| 5,898,308 A | | 4/1999 | Champion |
| 6,087,673 A | | 7/2000 | Shishido et al. |
| 6,229,476 B1 | * | 5/2001 | Lutke et al. .................. 342/124 |
| 6,606,904 B2 | * | 8/2003 | Muller et al. ............. 73/290 V |
| 6,677,534 B2 | * | 1/2004 | Yamamoto et al. ...... 174/113 R |
| 6,691,570 B1 | * | 2/2004 | Neuhaus et al. ........... 73/290 V |
| 7,098,843 B2 | * | 8/2006 | Abrahamsson ............... 342/124 |
| 7,129,783 B2 | * | 10/2006 | Young et al. ................. 330/286 |
| 7,148,801 B2 | * | 12/2006 | Crabtree et al. ......... 340/539.13 |
| 2002/0149518 A1 | * | 10/2002 | Haataja et al. .............. 342/458 |
| 2003/0112184 A1 | * | 6/2003 | Jenabi .................. 343/700 MS |
| 2004/0062386 A1 | * | 4/2004 | Tahernezhaadi et al. ....................................................... 379/406.01 |
| 2005/0083228 A1 | | 4/2005 | Edvardsson |
| 2005/0168379 A1 | * | 8/2005 | Griessbaum et al. ........ 342/124 |

FOREIGN PATENT DOCUMENTS

| | | |
|---|---|---|
| CA | 2 423 781 | 3/2003 |
| DE | 20016962 | 4/2002 |
| EP | 0 887 658 | 12/1998 |

* cited by examiner

*Primary Examiner*—Thomas H Tarcza
*Assistant Examiner*—Harry Liu
(74) *Attorney, Agent, or Firm*—Fay Kaplun & Marcin, LLP

(57) ABSTRACT

The shape or amplitude of reference pulses in a filling level radar typically depend on the component quality of the circulator used, of a transmitting/receiving coupler, or else of the circuit temperature. In case of large echoes at close range, the quality of the measurement may deteriorate. A radar module for extracting a reference signal for a filling level radar comprises a tap extracting the reference signal and a delay line delaying the transmit signal. Delaying the transmit signal on its way to the antenna takes place after the extraction of the leakage pulse.

22 Claims, 4 Drawing Sheets

REFERENCE PULSE GENERATION

REFERENCE TO RELATED APPLICATIONS

This application claims the benefit of the filing date of German Patent Application Serial No. 10 2005 057 053.4 filed Nov. 30, 2005 and U.S. Provisional Patent Application Ser. No. 60/741,190 filed Nov. 30, 2005, the disclosure of which applications is hereby incorporated herein by reference.

FIELD OF THE INVENTION

This invention relates to level measuring. In particular, this invention relates to a high frequency module for extracting a reference signal for a filling level measuring instrument, a filling level measuring instrument for determining a filling level in a tank, the use of such a high frequency module for filling level measuring, and a method for extracting a reference signal for a filling level measuring instrument.

BACKGROUND OF THE INVENTION

Known level measuring instruments have an antenna, which emits or receives radar or microwaves in order to determine the filling level of a medium in a filling material container. The antenna of such a level measuring instrument is then arranged for instance inside a container.

The high frequency modules of such level measuring instruments are used for generating transmit signals, which are emitted via the antenna towards the filling material. The measuring signals received are picked up via the antenna, and evaluated using a reference signal. This reference signal can be configured as a reference pulse (leakage pulse), the shape and amplitude of which depend on the component quality of a circulator, a transmitting-/receiving coupler, or the temperature of the measuring device as well. In addition, a reflection of the antenna as such or the antenna coupling may have a negative impact on the leakage pulse, e.g. if the antenna is arranged close to the coupler (circulator), or in case of large echoes at close range.

SUMMARY OF THE INVENTION

According to a sample embodiment of this invention, a high frequency module for extracting a reference signal for a level measuring instrument is provided, the high frequency module comprising a first transmission link for transmitting an electromagnetic transmit signal from a source to an antenna, or to a probe, a tap for extracting a reference signal from the transmission link, and a time-delay for delaying the transmit signal on its way to the antenna or probe, wherein the time-delay is arranged after the tap.

I.e., the transmit signal is thus tapped on its way to the antenna (in case of a filling level radar) or to a probe (in case of a TDR level measuring unit). The reference signal thus extracted may be used for evaluating a measuring signal from the antenna. After extraction of the reference signal, the transmit signal is time delayed in relation to the reference signal, so that e.g. large echoes at close range, reflections of the antenna or insufficient isolation of the transmitting-receiving coupler cannot interfere with the evaluation of the reference signal.

According to another sample embodiment of this invention, the tap comprises a first directional coupler.

The directional coupler is configured e.g. as a symmetric or asymmetric hybrid coupler.

Such a hybrid coupler may be integrated at low cost into a circuit of the high frequency module.

According to another sample embodiment of this invention, the time-delay comprises a delay line.

E.g., the delay line is configured as a strip line, which is integrated into a multilayer circuit board. Such a strip line has ground planes on either side, i.e. may be for example arranged in a different plane as the transmission link. Depending on the desired delay, the strip line may have a corresponding length.

According to another sample embodiment of this invention, the delay line is configured as a microstrip.

Also, the delay line may have a so-called "Low Temperature Cofired Ceramic" (a so-called LTCC component). This ceramic has a high dielectric constant, and may e.g. be SMD populated.

According to another sample embodiment of this invention, the delay line is configured as a wound coaxial cable.

The directional coupler for extracting the reference signal may have a variable coupling factor.

According to another sample embodiment of this invention, a controller is provided, which is configured for setting the coupling factor of the directional coupler.

Depending on environmental conditions and requirements, this controller may perform adequate settings at the coupling factor of the directional coupler. Thus, the amplitude of the reference pulse may be varied adequately.

According to another sample embodiment of this invention, the high frequency module comprises in addition a second transmission link for transmitting a measuring signal from the antenna to an evaluation circuit, and a coupling for coupling a reference signal into the second transmission link.

This may ensure that the extracted reference signal can be used for evaluating the measuring signal, wherein the measuring signal has been delayed in relation to the reference signal.

According to another sample embodiment of this invention, the coupling is configured as a directional coupler, which may be e.g. a hybrid coupler.

According to another sample embodiment of this invention, the high frequency module comprises in addition a pulse generator for generating a pulsed transmit signal, wherein the reference signal is a reference pulse.

According to another sample embodiment of this invention, a level measuring instrument for determining a filling level in a tank is provided, the level measuring instrument comprising a high frequency module as described above.

According to another sample embodiment of this invention, the level measuring instrument comprises an antenna for transmitting and/or receiving electromagnetic waves.

According to another sample embodiment of this invention, the level measuring instrument comprises a probe for transmitting the electromagnetic waves to the filling material.

In addition, the use of a high frequency module according to the invention for level measuring is provided.

In addition, a method for extracting a reference signal for a filling level radar is provided, wherein an electromagnetic transmit signal is transmitted via a transmission link from a source to an antenna, a reference signal is extracted from the transmission link, the transmit signal is delayed on its way to the antenna, wherein the delay of the transmit signal takes place after the extraction of the reference signal.

Thereby, a method is provided, by which a leakage pulse may be picked up, which is not biased by the antenna pulse, even if the antenna is arranged close to the coupler, or in the case of large echoes at close range. Thereby, the quality or accuracy of the measurement may be substantially increased.

Further sample embodiments, objects, and advantages of the invention result from the subclaims.

Hereafter, with reference to the figures, sample embodiments of this invention will be described.

SHORT DESCRIPTION OF THE FIGURES

DETAILED DESCRIPTION OF EXEMPLARY EMBODIMENTS

The views in the figures are schematic and not to scale.

In the following description of the figures, the same reference symbols may be used for identical or similar items.

Figure 1:
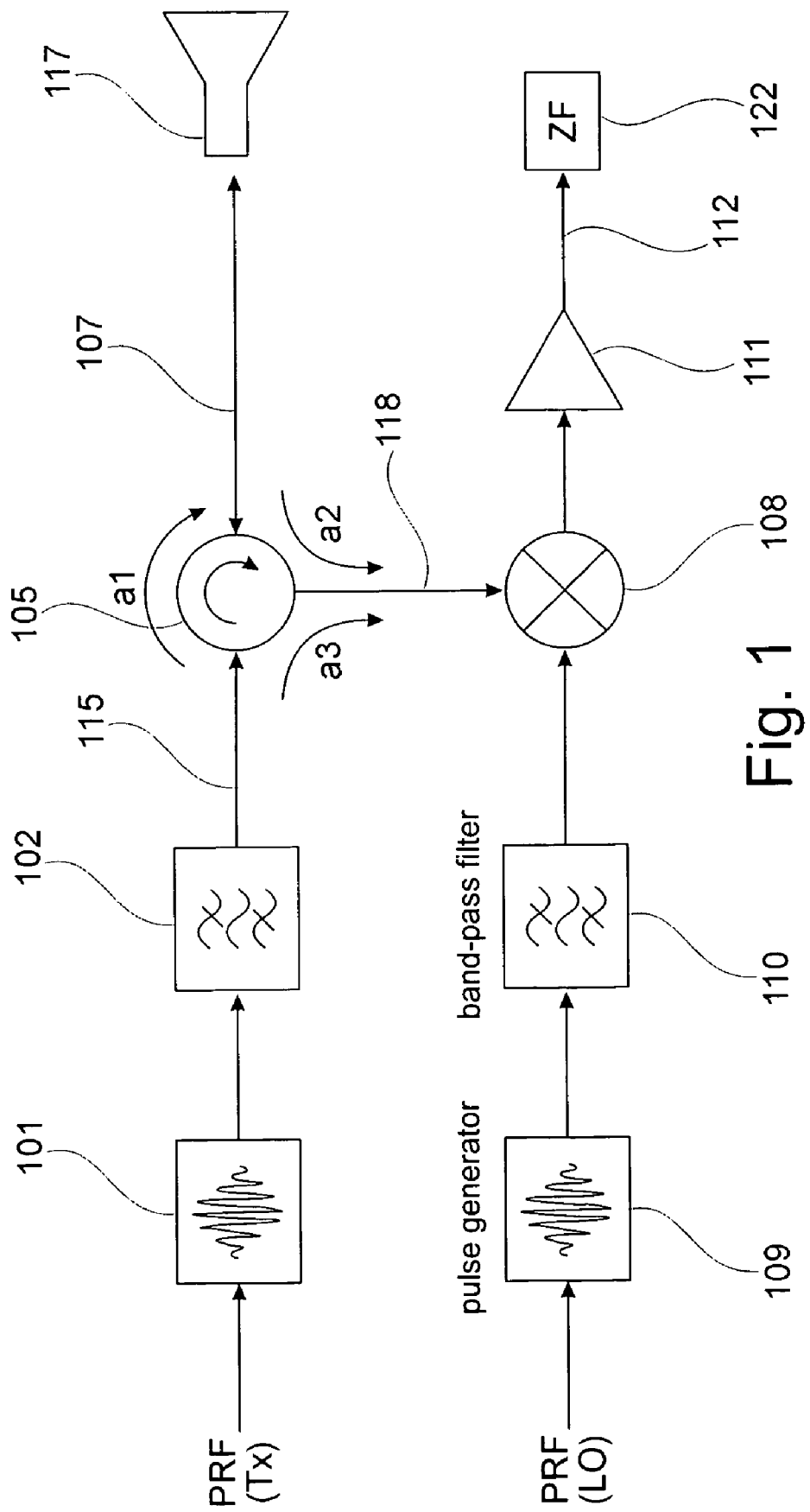
FIG. 1 shows a schematic view of a high frequency module.

FIG. 1 shows a schematic view of a radar module. The radar module has a pulse generator 101, which is used for generating a transmit pulse. This transmit pulse is then filtered via the band-pass filter 102 and supplied to a circulator 105 via the transmission link 115.

The pulse travels through the circulator with an attenuation of a1=1 dB, and is transmitted via line 107 to the antenna 117. Next, the antenna 117 sends the pulse towards the filling material, and receives thereupon a corresponding measuring pulse. The measuring pulse is transmitted via line 107 to the circulator 105, and then delivered to line 118, also with an attenuation of a2=1 dB.

In addition, during the transmission of the transmit signal from line 115 to line 107 towards the antenna, the circulator 105 derives a reference pulse from line 115 to line 118 at an attenuation of a3=20 dB. The reference pulse and the measuring signal are fed into the sampling mixer 108.

A second pulse generator 109 is provided, which generates a pulsed signal, which travels through a band-pass filter 110, and is then also entered into the sampling mixer 108.

Next, the sampling mixer 108 generates a retarded or time elongated signal, which is amplified by the amplifier 11, and then forwarded as an intermediate frequency 112 to an evaluation circuit 122.

Figure 2A:
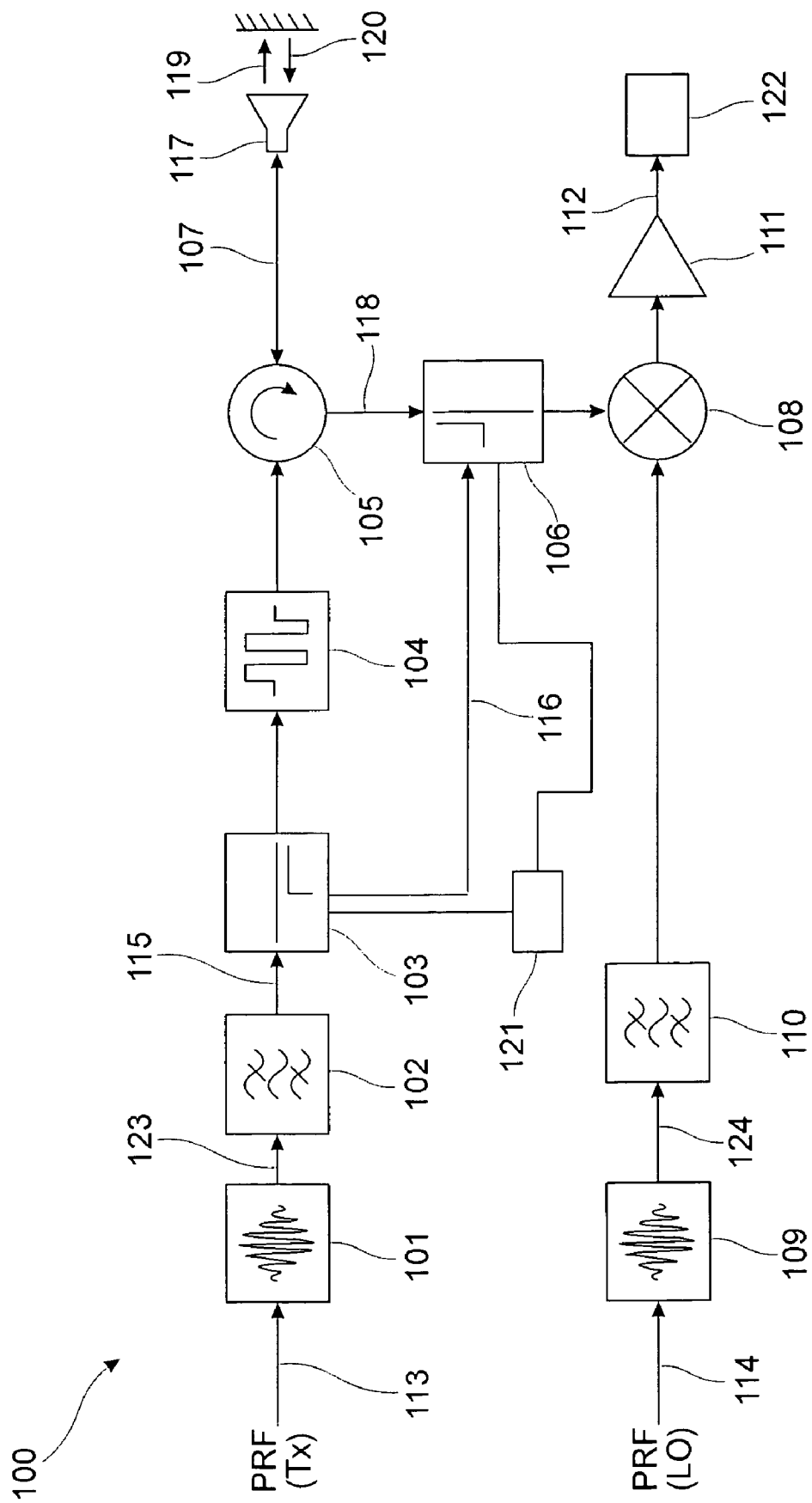
FIG. 2a shows a schematic view of a high frequency module according to a sample embodiment of this invention.

FIG. 2a shows a schematic view of a radar module according to a sample embodiment of this invention. As may be seen in FIG. 2a, the radar module 100 comprises substantially a transmission link 115 for transmitting an electromagnetic transmit signal from a pulse generator 101 to an antenna 117, a tap 103 for extracting a reference signal from the transmission link 115, and a time-delay 104 for delaying the transmit signal on its way to the antenna 117. Herein, the time-delay 104 is arranged after the tap 103.

Instead of an antenna 117, it may also be possible to provide a line for conducting the transmit signal to the filling material in order to perform a non contactless measurement.

The pulse generator 101 is fed by a PRF(Tx) signal 113 with the pulse repetition frequency (PRF) for the transmit path (Tx).

The output signal 123 generated by the pulse generator 101 is thereafter filtered in a band-pass filter 102, and then travels through the transmission link 115 to the directional coupler 103 (tap).

The directional coupler 103 is configured e.g. as an asymmetric hybrid coupler, the coupling factor of which is variable. From the transmit signal, a reference pulse 116 is then derived or extracted via the directional coupler and supplied to a second directional coupler 106.

After tapping of the reference pulse, the transmit signal travels through a delay line 104 so as to be time delayed. This delay line 104 is configured e.g. as a strip line in a multilayer circuit board, as a wound coaxial cable, or as a LTCC component. After the time delay of the transmit signal, the transmit signal travels through a circulator 105, which forwards the transmit signal with low attenuation via the transmission link 107 to the antenna 117.

By the antenna 117, the transmit signal is then emitted, and transmitted as a signal 119 towards the filling material. Therefrom, it is then reflected as the receive signal 120 and picked up by the antenna 117 and supplied to the circulator 105. Therein, the receive signal is then conducted with low attenuation to line 118, and then to the directional coupler 106, where it merges with the reference pulse.

The reference pulse and the receive signal (measuring signal) are forwarded to the sampling mixer 108. The sampling mixer 108 is driven by the second pulse generator 109.

The second pulse generator 109 (which by the way may be either a stand-alone unit or be the same as the first pulse generator 101) is supplied by a PRF (LO) Signal 114 with the pulse repetition frequency (PRF) of the local oscillator (LO) and generates a pulsed output signal 124, which thereafter travels through the band-pass filter 110 before being supplied to the sampling mixer 108.

When the sampling mixer 108 has retarded the measuring signal, amplification of the output signal by the amplifier 111 takes place. The resulting signal 112 is then supplied as an intermediate frequency to the evaluation circuit 122.

The amplitude of the reference pulse may be set via the coupling factor of the directional couplers 103, 106. The directional couplers 103, 106 may be driven via a controller 121, and thus the coupling factors thereof may be set (individually or in common).

The improved pulse form of the reference pulse provides for higher accuracy of the measurement. Due to tapping the reference pulse in combination with the delay line, biasing of the reference pulse by the antenna or the coupling or due to echoes at close range may be avoided.

Figure 2B:
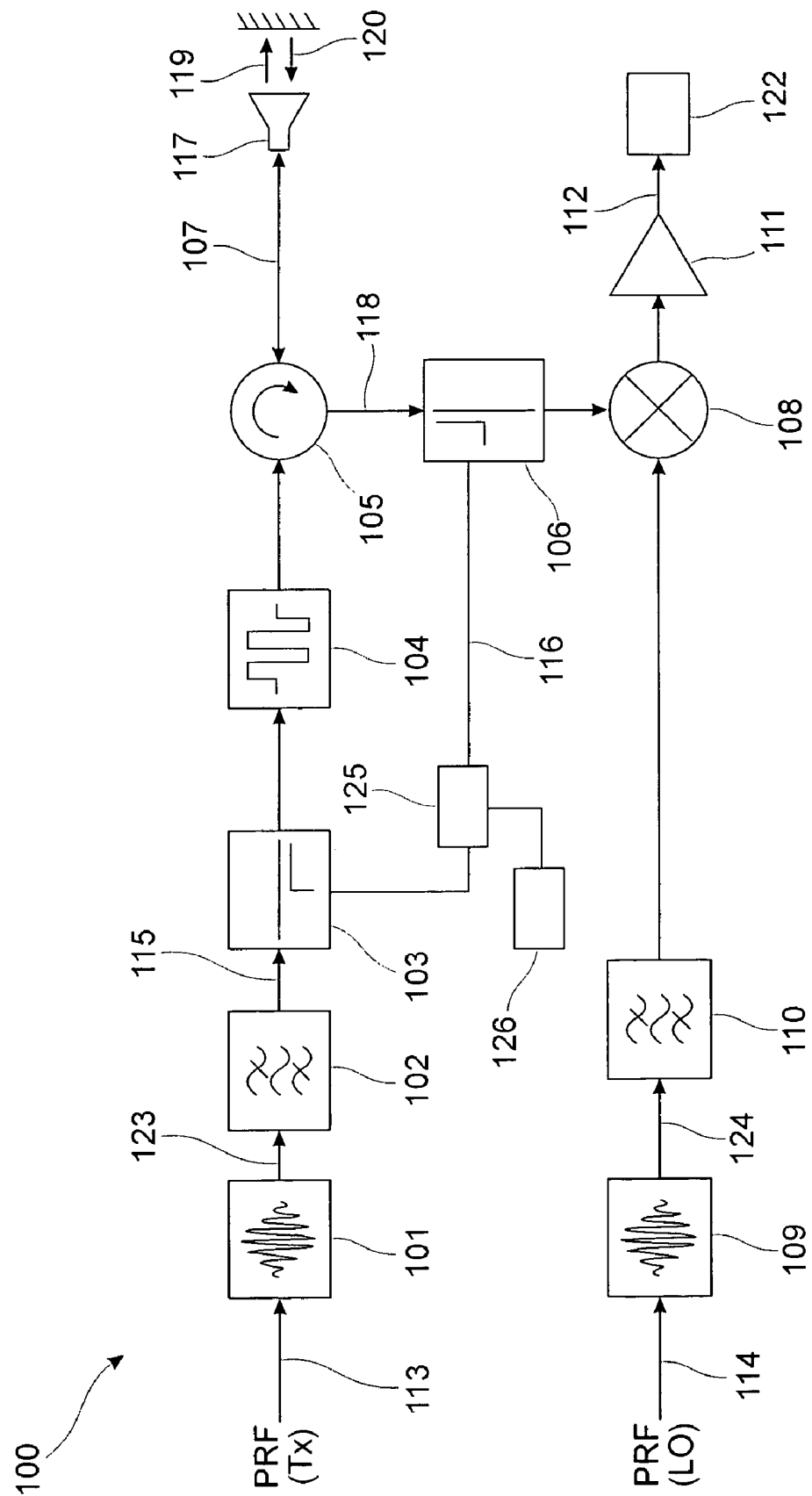
FIG. 2b shows a schematic view of a high frequency module according to another sample embodiment of this invention.

FIG. 2b shows a similar arrangement as FIG. 2a, however, herein an attenuation member 125 is inserted between the directional couplers 103 and 106, which may allow to set the magnitude of the reference signal 116. This attenuation member 125 may be configured as a fixed attenuation member or as a variable attenuation member, which may then be set individually via a controller 126.

Figure 3:
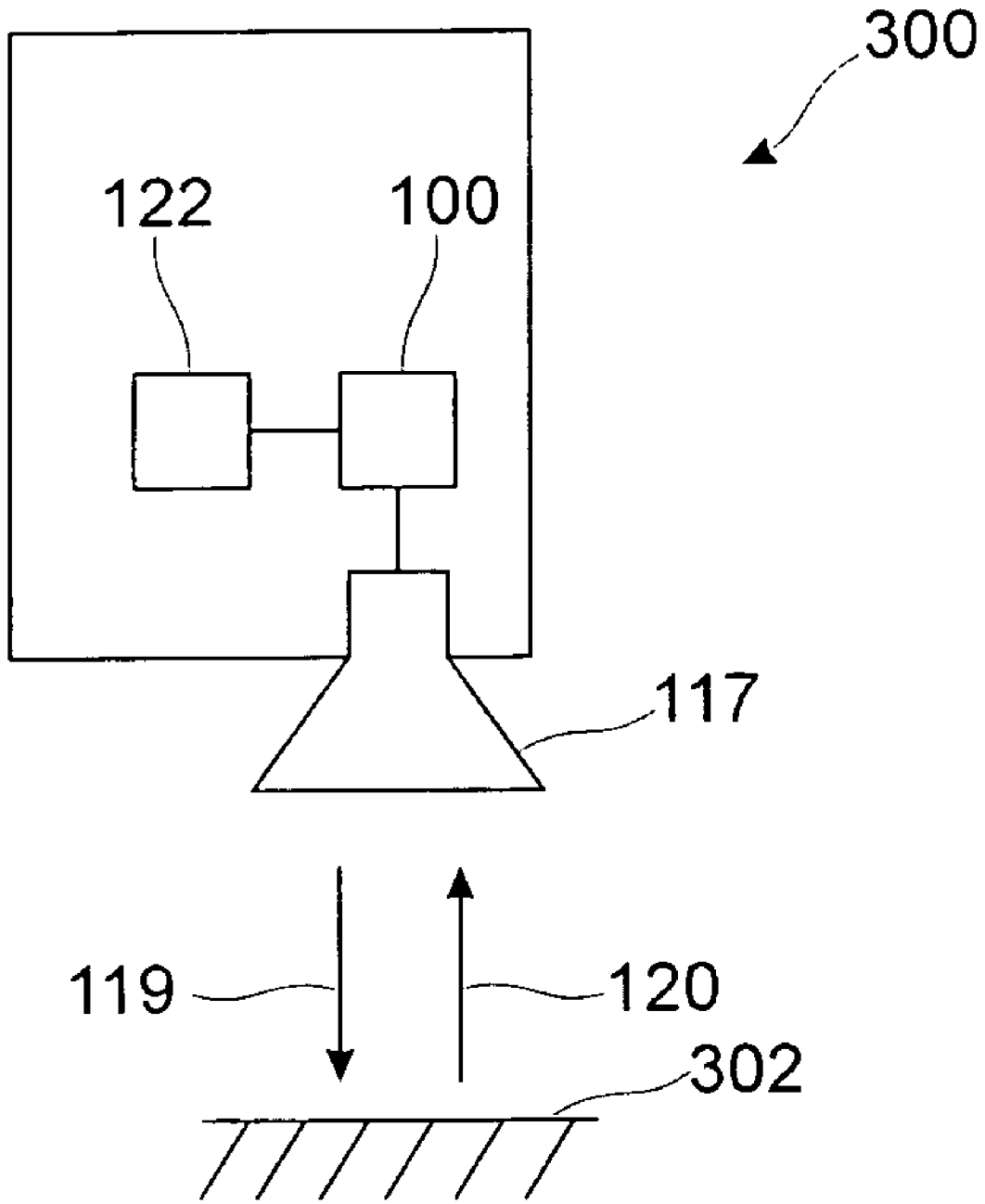
FIG. 3 shows a schematic view of a level measuring instrument according to a sample embodiment of this invention.

FIG. 3 shows a schematic view of a filling level radar according to a sample embodiment of this invention. As may be seen in FIG. 3, the filling level radar 300 has a radar module 100, an evaluation circuit 122, and an antenna 117. Herein, the antenna 117 is used for transmitting and receiving electromagnetic signals 119, 120, which are reflected by a filling material surface 302.

The level measuring instrument 300 may be configured as a filling level radar or else for non contactless measuring of filling levels, e.g. as a TDR unit.

Additionally, it is to be noted that "comprising" does not exclude any other items or steps, and that "a" or "an" do not exclude a plurality. Furthermore, it is to be noted that features or steps having been described with reference to one of the above sample embodiments can also be used in combination with other features or steps of other embodiments described above. Reference numerals in the claims are not to be construed as limitations.

What is claimed is:

1. An apparatus for extracting a reference signal for a level measuring instrument, comprising:
    a first transmission link transmitting an electromagnetic transmit signal from a source to an antenna or a probe;
    a tap extracting a reference signal from the transmission link; and
    a time-delay delaying the transmit signal by a predetermined amount of time on its way to the antenna or probe;
    wherein the time-delay is arranged after the tap, and the predetermined amount is selected to substantially avoid interference between the reference signal and large echoes of the transmit signal at close range or antenna reflections.

2. The apparatus according to claim 1, wherein the tap comprises a first directional coupler.

3. The apparatus according to claim 2, wherein the directional coupler is configured as a hybrid coupler.

4. The apparatus according to claim 1, wherein the time-delay comprises a delay line.

5. The apparatus according to claim 4, wherein the delay line is configured as a strip line in a multilayer board.

6. The apparatus according to claim 4, wherein the delay line is configured as a microstrip.

7. The apparatus according to claim 4, wherein the delay line is configured as a LTCC component.

8. The apparatus according to claim 4, wherein the delay line is configured as a wound coaxial cable.

9. The apparatus according to claim 2, wherein the directional coupler has a variable coupling factor.

10. The apparatus according to claim 9, further comprising:
    a controller setting the coupling factor.

11. The apparatus according to claim 2, further comprising:
    an attenuation member adapting the magnitude of the reference signal.

12. The apparatus according to claim 10, further comprising:
    a controller setting the attenuation.

13. The apparatus according to claim 1, further comprising:
    a second transmission link transmitting a measuring signal from the antenna or probe to an evaluation circuit; and
    a coupling coupling the reference signal into the second transmission link.

14. The apparatus according to claim 13, wherein the coupling is a directional coupler.

15. The apparatus according to claim 1, further comprising:
    a pulse generator generating a pulsed transmit signal,
    wherein the reference signal is a reference pulse.

16. A level measuring instrument for determining a filling level in a tank, comprising:
    a apparatus according to claim 1.

17. The level measuring instrument according to claim 16, further comprising:
    an antenna which at least one of transmitting and receiving electromagnetic waves.

18. The level measuring instrument according to claim 16, further comprising:
    a probe transmitting the electromagnetic waves to the filling material.

19. Use of a apparatus according to claim 1 for level measuring.

20. A method for extracting a reference signal for a level measuring instrument, comprising the steps of:
    transmitting an electromagnetic transmit signal via a transmission link from a source to a probe or an antenna;
    extracting a reference signal from the transmission link; and
    delaying the transmit signal by a predetermined amount on its way to the probe or antenna;
    wherein the delay of the transmit signal takes place after the extraction of the reference signal, and the predetermined amount is selected to substantially avoid interference between the reference signal and large echoes of the transmit signal at close range or antenna reflections.

21. The apparatus of claim 1, wherein the electromagnetic transmit signal is in the high frequency range.

22. The method of claim 20, wherein the electromagnetic transmit signal is in the high frequency range.

* * * * *